2 Sheets. Sheet 1.

J. R. Hall,

Sawing Shingles.

No. 1,550. Reissued Oct. 6, 1863.

Witnesses:
John W. Perry
Ward Coburn

Inventor:
Jerrie R. Hall

AM. PHOTO-LITHO. CO. N.Y. (OSBORNE'S PROCESS)

2 Sheets, Sheet 2.

J. R. Hall,

Sawing Shingles.

No. 1,550. Reissued Oct. 6, 1863.

Witnesses:
John W. Perry
Mark Colwin

Inventor:
Jerrie R. Hall

AM. PHOTO-LITHO. CO. N.Y. (OSBORNE'S PROCESS)

UNITED STATES PATENT OFFICE.

JERRIE R. HALL, OF BRUNSWICK, MAINE.

IMPROVED SHINGLE-MACHINE.

Specification forming part of Letters Patent No. 20,638, dated June 22, 1858; Reissue No. 1,550, dated October 6, 1863.

*To all whom it may concern:*

Be it known that I, JERRIE R. HALL, of Brunswick, in the county of Cumberland and State of Maine, have invented new and useful Improvements in Machines for Sawing Shingles; and I do hereby declare that the following is a full and complete description of the construction and operation of the same, reference being had to the accompanying drawings, making part of this specification, in which—

Figure 1:
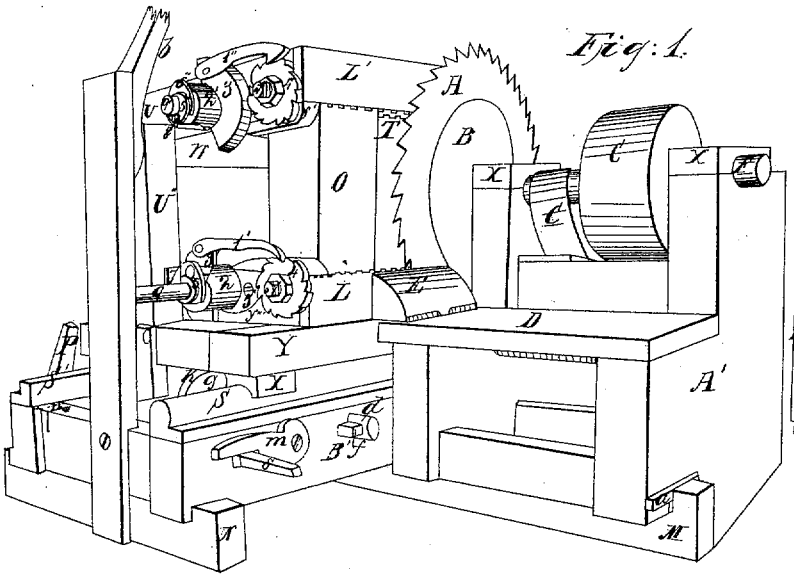
Figure 4:
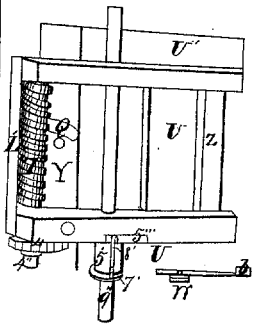
Figure 5:
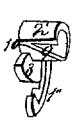
Figure 3:
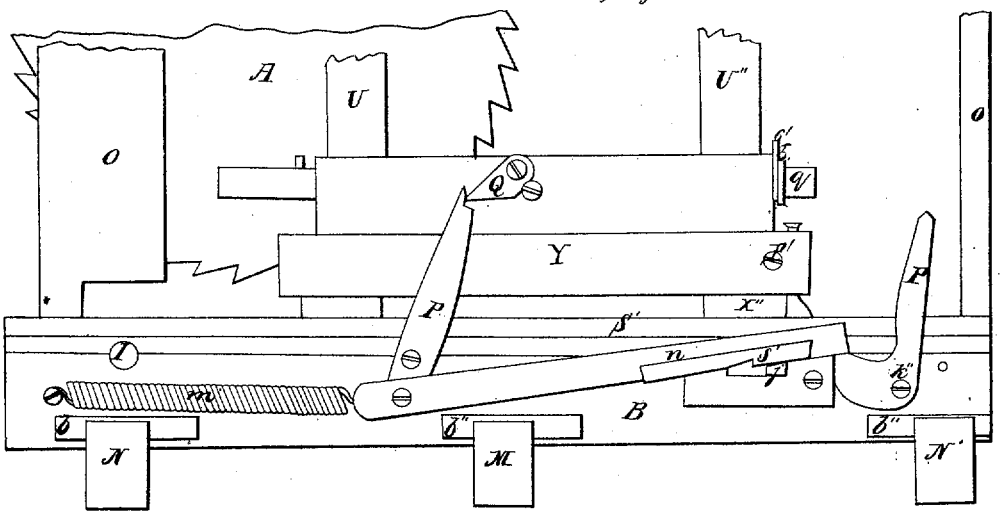
Figure 2:
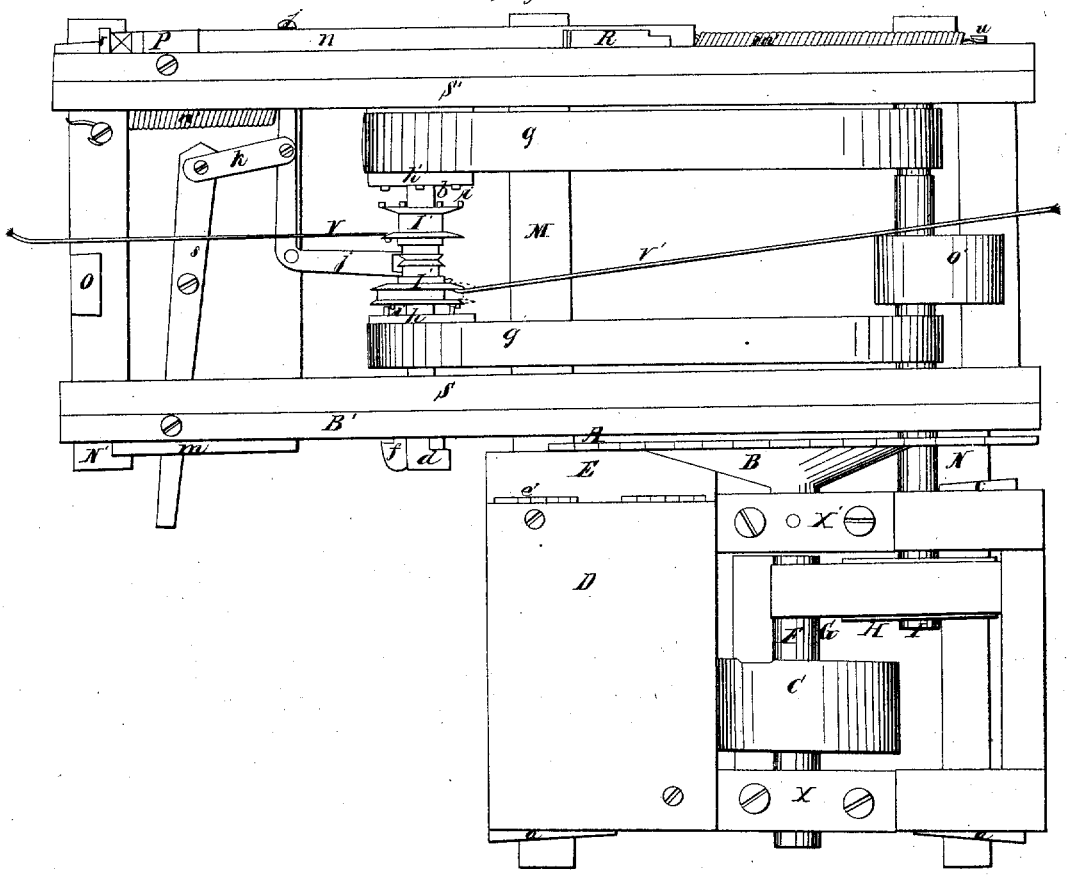

Figure 1 is a perspective view of the front side. Fig. 2 is a horizontal view without the carriage. Fig. 3 is a side view of the back of the machine. Fig. 4 is a sectional view of the parts for holding the bolt and feeding it toward the saw. Fig. 5 is a view of one of said parts; and Fig. 6 is an end view of the ratchet-wheels, pawls, feed-rollers, and shingle-bolt.

The nature of my invention consists in devices for holding the bolt while being sawed into shingles; to feeding the bolt to the saw in such a manner that the thick and thin ends of the shingles are cut alternately from the same end of the bolt—in other words, moving the bolt at its respective ends alternately a distance suited to the thickness of the butt and tip of the shingle, the butt and tip alternately changing; to the improved means by which motion is given to the carriage on the bed of the machine, and to a fender against the side of the saw, provided with hinges and a spring, so that it will press off and let any piece which may catch between it and the saw pass through without binding the saw and spring back to its place.

To enable others skilled in the art to make and use my invention, I will proceed to describe its construction and operation.

I attach the saw A, Fig. 1, to the collar B by means of a double row of rivets or screws, one row being near the edge of the collar and the other near the shaft. I fasten the collar B upon the shaft F in any manner so that it will be permanent, and not project beyond the surface of the saw on the side opposite the collar. The shaft F is mounted on the frame A′, and secured by caps X X′. Motion is given to the saw by a belt over the pulley C on the shaft F. I connect the frame A′ with the bed B′, by means of the transverse timbers M and N, (shown in Figs. 2 and 3,) into which I cut gains and match them, and fasten by keys *b′ b″* and *a a′ a″ a‴*, (*a‴* not shown.)

By means of the keys *a a′ a″ a‴*, I am enabled to change the range or tram of the saw, so that it shall cut in a line parallel with the track S S′, which guides the carriage Y in its motion on said track.

I use the following means to give the carriage a steady motion when feeding forward and an accelerated reverse motion, so that it will run back quicker and stop easy without the jar or concussion experienced in machines that have a quick regular motion backward, on stopping suddenly. This backward movement is eccentric—that is, first increasing then decreasing, until it stops—which prevents the concussion, and is accomplished thus, viz: On the stationary shaft *b*, which is secured by boxes *d d′*—one at each end—I place pulleys *h h′*, said pulleys being loose on the shaft, and provided with side spurs, *i i*, to catch on corresponding spurs on the loose pulleys I′ I″ on the same shaft, between pulleys *h h′*. Pulleys *h h′* are kept from vibrating by means of shoulders on shaft *b*, against which the pulleys are pressed by the ends of the boxes *d d′*, which hold the ends of the shaft *b*. Motion is given to pulleys *h h′* by belts *g g′* from shaft I, which receives its motion from shaft F by belt G over pulley H. To the loose pulleys I′ I″ are attached ropes V V′. Rope V′ is attached to the eccentric pulley I′ on the side, so that it will commence winding slowly and quicken as the pulley revolves part way, and slowly again as it finishes the revolution, which single revolution is all that is required to carry the carriage Y the whole distance. Said rope extends to the forward end of the carriage Y. The other rope, V, on pulley I″ extends to the other end of the carriage. Pulleys I′ I″ are moved together from side to side by the clutch-lever *j*, which is actuated automatically by springs *n′ m′*, lever R, and bar *n*, with catch S′ and cams Q and P and pin or bolt P′, Fig. 3, or by the hand-lever *s* and button *m*, (lever *s* is connected with clutch *j* by rod *k*, and pivoted at *t*,) the operation of all which is as follows: The button *m* being down, the lever *s*, which controls the clutch-lever *j* and is always drawn by spring *n′*, is stopped midway, and the pulleys I′ I″ are both out of gear, between pulleys $h$ $h'$, and the carriage Y is at rest. Now raise button $m$, and spring $n'$ immediately pulls lever $j$ back, which moves the spurs on the pulley I'' into gear with the spurs on the pulley $h'$, when it revolves and winds up the rope V, which draws the carriage Y along with it until the cam Q carries the lever R, pivoted at S'', forward, which moves the bar $n$, connected with R at S''', backward far enough for catch S' to fall over the end of lever $j$, the spring $m'$ being strained at the same time, when the cam Q slips over the end of the lever B, and the spring $m'$ overcomes the spring $n'$ and moves the pulleys I' I'' across the space, and brings the spurs of the eccentric pulley I' into gear with the spurs of pulley $h$, when it winds up the rope V' and draws the carriage Y backward (which winds the rope V, upon the pulley I' as the carriage moves) until cam Q drops over the end of the lever R and pin or bolt P', Fig. 3, strikes cam P at K'', which raises the end of bar $n$ and catches $s'$ with $j$, when the spring $n'$ again draws back the lever $j$ unless lever $s$ is arrested by the button $m$ being down, in which case the motion would be stopped; but if the button is kept up the carriage will be kept in continual motion.

Lever $s$ has complete control of the pulleys I' I'', so that it is only necessary to press hard enough upon it to overcome the spring to reverse the motion at any time.

I construct the carriage Y in the form of a square frame and fasten boxes $x$ $x'$ $x''$ $x'''$ on the under side, two of which are flat and run on slide S'. The other two are concave and run on the track S, which guides the carriage in a straight line. Across the carriage Y, I place two timbers, $y''''$, similar to $y''$ $y'''$ in Fig. 4. On the front ends of $y''''$, extending from one to the other, is a toothed jaw, L. Inside of jaw L is a feed-roller, T', which rests its journals in boxes on the timbers $y''''$ and secured by caps $y$ $y$. The feed-roller T' is provided with teeth or spurs which project slightly above the edge of the jaw L, and upon these the shingle-bolt O rests, as shown in Fig. 6. Another feed-roller, T, with its corresponding jaw, L', rests upon and secures the upper end of the shingle-bolt O. This upper roller and jaw are hinged in such a manner, as hereinafter stated, that the weight of the roller and frame (shown detached in Fig. 4) will rest upon the end of the bolt O. Upon the end of each feed-roller T T', I secure by a nut, 7, the notched or ratchet wheels 4 4', having the spaces between the teeth alternately long and short. These ratchet-wheels are worked by palws 1' 1'', and the feed-rollers are so adjusted, as regards each other, that when one pawl passes over a long space the other pawl will pass over a short space, and thus the respective ends of the bolt O will be fed up to the saw or cutting-knife at unequal distances, in order to form the proper taper to the shingle, and these long and short movements alternate at every cut of the saw or knife, as herein elsewhere explained.

On the side timber, $y''''$, a thimble, 5''', is fastened by its flange 5'', similar to 5' 5', Fig. 4, through which pass rods $q$ $q'$. In the side of these thimbles are slots 6 and 8, through which flat pins 7 7' on rods $q$ $q'$ slide and project through the slot and strike the inclines on the sleeves 2 2', (seen at 9, Fig. 5,) which turns as the rods are driven in until the pins 7 7' reach the end of the incline, (shown at 10, Fig. 5,) when the sleeve stops turning, although the rods move farther. As the sleeves 2 2' turn, flanges 3 3', connected, turn with them and move the pawls 1' 1'' which catch against the teeth on the wheels 4 4' (one pawl moving over a long space and the other moving over a short space, as before stated,) thus moving one of the feed-rollers, T or T', a distance suitable for the butt-end of the shingle, and the other roller a distance suitable for the tip end of the shingle.

On the back end of timbers $y''''$ are upright timbers U' U'', between which is hung a frame, U, (shown detached in Fig. 4,) in which figure it is represented as being turned back on its pivot Z, and hanging down on the back side of carriage Y. As before stated, the feeding apparatus connected to this frame is very nearly a duplicate of that shown below, only it is in reverse order and can be turned back, as above stated. Its natural position is shown in Figs. 1 and 6, in which position the weight rests chiefly upon the bolt O. The bolt O is placed upright on the feed-roller T', Fig. 1, and the frame U, Fig. 4, is let down so that the feed-roller T rests upon the upper end of the bolt O. I make the frame heavy enough to hold the bolt firmly while being sawed.

As the carriage Y feeds forward, the jaws L L' are carried close to the saw A, and what projects beyond them is sawed off. The rods $q$ $q'$ are brought against post $o'$, which presses them back, as represented at Fig. 4, and carries pins 7 7' to the other end of the slots 6 and 8, when the sleeves 2 2', being released, turn back by the weight of their flanges 3 3', and pawls 1 1'' drop over the next tooth on the wheels 4 4', these wheels being so adjusted that a long space and a short one shall stand in opposition to each other, then the carriage Y, being reversed in the direction of its motion, runs back, and the rods $q$ $q'$ strike against the post $o'$ and are driven in, and the pins 7 7', sliding through slots in the thimbles 5' 5'', press against the inclines on the sleeves 2 2' and turn them until they arrive at the end of the incline, when the pins move a little farther, but do not move the sleeves. The pawls, being attached to flanges 3 3', are moved a little more than the length of the long space between the teeth on the wheels 4 4'; but they being placed so that one rests on a long and the other on a short space, it moves one feed-roller farther than the other, and the bolt O is turned outward the thickness of a butt-end of a shingle at one end and the thickness of the tip at the other, when the carriage moves forward and a shingle is sawed or cut off, and the same operation is repeated until the bolt is sawed up, the relative position of the pawls 1′ 1″ on the teeth of the wheels 4 4′ in regard to the long and short spaces between the teeth alternately changing, so that the bolt is sawed up into shingles, butt and tip changing alternately. When the bolt is all fed up to the saw or knife so that it leaves the feed-rolls, the frame U drops, and the jaws L L′ firmly grasp the piece and hold it so that the saw cannot catch and throw it out. When the bolt is sawed up, the lever *b* is thrown back, which turns shaft *w*, upon which are cams that raise the frame U, and the piece left is taken out and another bolt put in its place, when the lever is drawn forward and the weight of the frame U rests on the top of the bolt, and it is ready to be sawed.

As the shingles are sawed off, they fall and are guided by the fender E down upon the the bench D. Fender E is provided with hinges *e e′*, which allow it to be pressed off, if anything should catch between it and the saw, and the spring Z, connected with it by a cord underneath, draws it back to its place after the piece has passed through.

This system of feed-rollers may with equal facility be applied to a cutting-machine as well as sawing, and the rollers may be provided with a series of spurs, or they may be fluted. The operation in either case is the same.

What I claim as my improvement, and desire to secure by Letters Patent, is—

1. The combination of rods *q q′* with their pins 7′ 7, thimbles 5′ 5″, with their slots 6 and 8, sleeve 2 2′, and pawls 1′ 1″ with the notched wheels 4 4′ and rolls T T′, for feeding the bolt to the saw.

2. The arrangement of the frame U in relation to the other parts for fastening and holding the bolt while being sawed.

3. The hinged fender E, with its cord and spring Z.

4. The combination of springs *m′* and *n′* clutch-lever *j*, lever R, bar *n*, with its catch S′, cams Q and P, and pin P′ with the pulleys I′ I″ and *h h′*, for giving motion to the carriage Y, all of which operate substantially as and for the purpose set forth.

5. The feed-rollers T T′, in connection with the ratchet-wheels 4 4′, with unequal spaces between the teeth, for the purpose of moving the bolt unequal distances at their respective ends, for the purpose specified.

J. R. HALL.

Witnesses:
J. M. YOUNG,
H. C. JONES.